Sept. 27, 1955   L. R. HAVERBERG   2,718,650
WASHING APPARATUS FOR AUTOMOBILE WHEELS
Filed Aug. 3, 1953   2 Sheets-Sheet 1
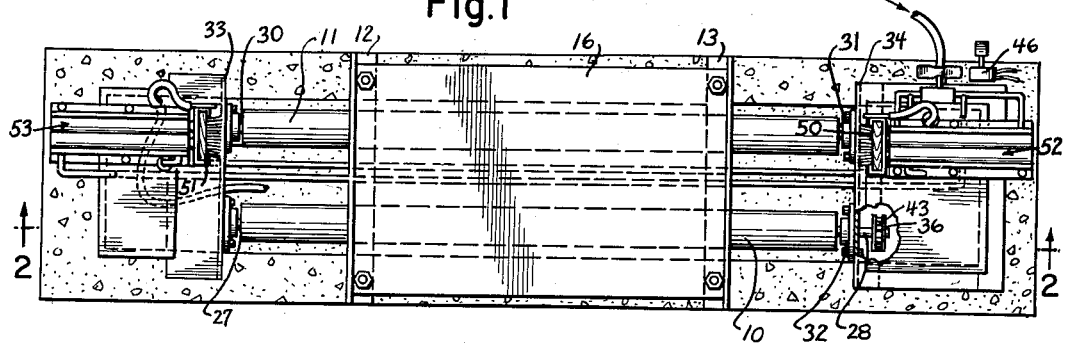
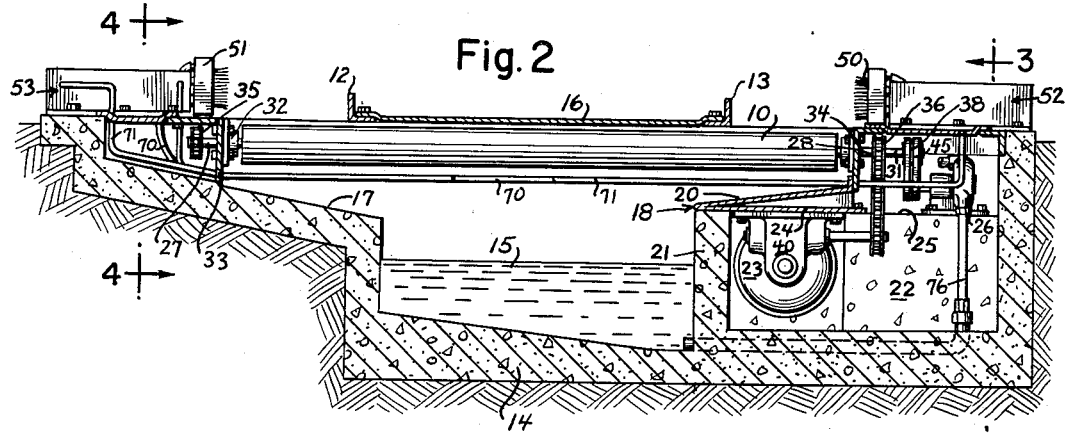
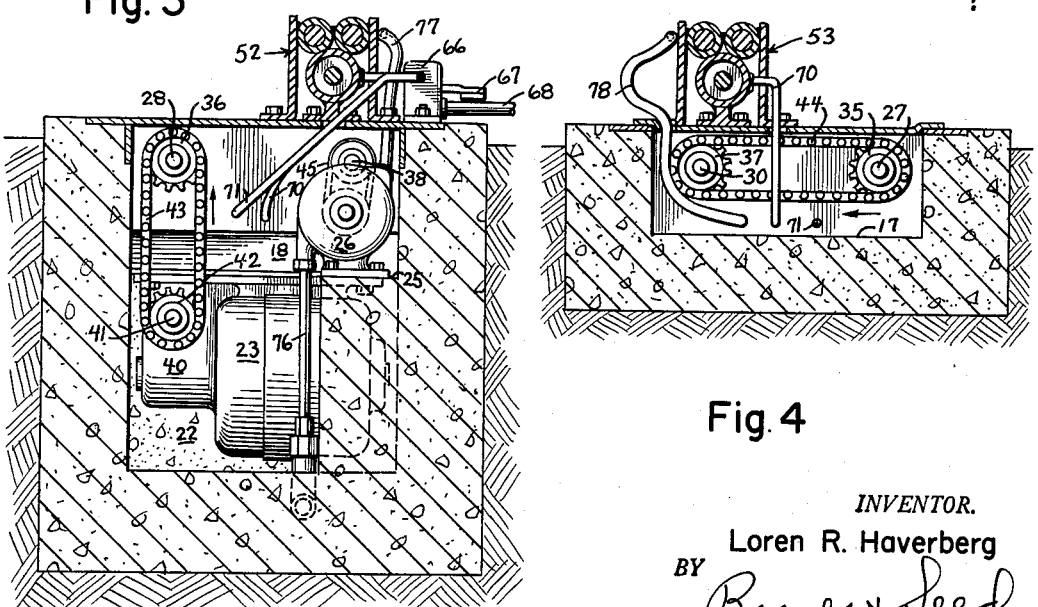
INVENTOR.
Loren R. Haverberg

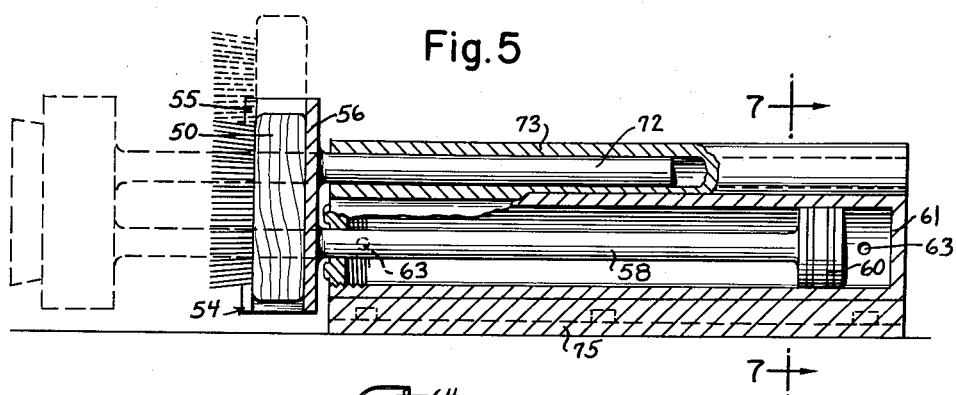
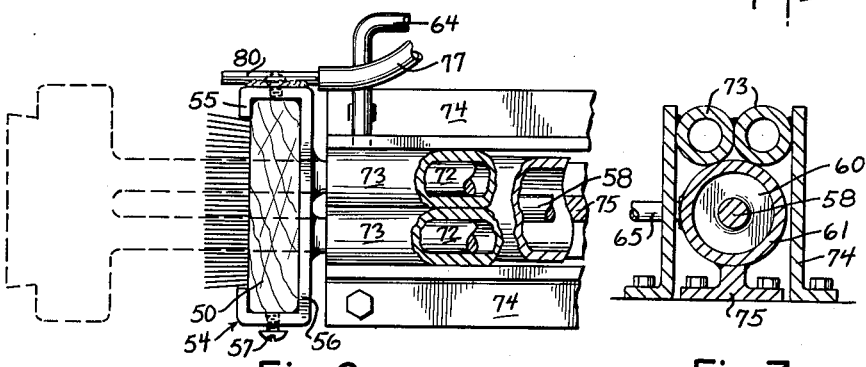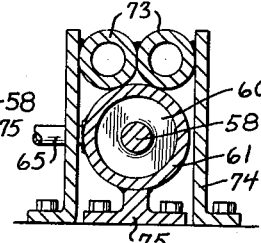
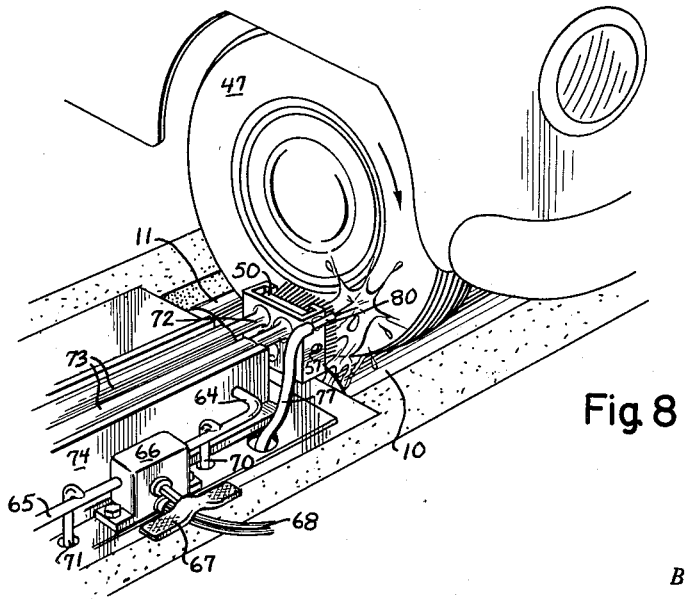
INVENTOR.
Loren R. Haverberg

United States Patent Office 2,718,650
Patented Sept. 27, 1955

2,718,650

WASHING APPARATUS FOR AUTOMOBILE WHEELS

Loren R. Haverberg, Seattle, Wash.

Application August 3, 1953, Serial No. 371,820

1 Claim. (Cl. 15—21)

The present invention relates to washing apparatus for automobile wheels, and more particularly, to such apparatus in which a pair of the wheels is supported upon and caused to turn by a pair of rotating rollers and in which a scrubbing action is performed by brushes engaging the rotating wheels. Since different makes and models of cars have various widths between the outside faces of each pair of their wheels, it is necessary that the distance between the wheel scrubbing brushes at opposite sides of the apparatus be variable at will by the operator. It is also necessary that the brushes be urged against the wheels with a predetermined force to get the most efficient scrubbing action for any given brush and it is desirable that this pressure be adjustable and independent of the spacing of the brushes. A further requirement for the best results is a thorough and continuous spreading of a detergent or other suitable cleaning agent upon the entire wheel surface to be cleaned while the wheels are rotating.

Accordingly, it is a principal object of the present invention to provide a relatively simple and inexpensive commercial wheel washing machine which will speedily fulfil all of the aforesaid requirements and which will not require the attention of the operator while a pair of wheels is being scrubbed so that he can be free to perform some other task at the same time such as collecting a customer's money, rinsing the pair of wheels theretofore scrubbed, etc.

With the foregoing and still more particular objects and advantages in view, the invention consists in the novel construction and in the adaptation and combination of parts hereinafter described and claimed.

In the accompanying drawings:

Figure 1 is a horizontal plan view of my invention.

Fig. 2 is a longitudinal vertical section taken along line 2—2 of Fig. 1.

Figs. 3 and 4 are transverse vertical sections taken along lines 3—3 and 4—4, respectively, of Fig. 2.

Fig. 5 is an enlarged longitudinal vertical sectional view of one of the brush and hydraulic cylinder assemblies.

Fig. 6 is a fragmentary plan view of the assembly shown in Fig. 5.

Fig. 7 is a transverse vertical sectional view taken on line 7—7 of Fig. 5; and

Fig. 8 is a perspective view illustrating a wheel being cleaned by my invention.

Referring to the drawings it is seen that a pair of rollers 10, 11 are journal mounted in spaced parallel relation across a car lane the inner bounds of which are defined by a pair of guide rails 12, 13. These rails traverse a concrete sump 14 lying below the rollers and provided as an accumulator for a suitable cleaning agent such as a detergent 15. The center portions of the rollers and sump are covered by a plate 16 extending between the rails 12, 13 leaving the end portions of the rollers exposed to receive the automobile wheels and permitting the detergent which is applied to the wheels free to drain back into the sump. In this latter regard the configuration of the sump is of little moment as long as this drainage is effected, and for purposes of example, I have provided a sloping return wall 17 to one end of the sump and a corresponding plate unit 18 sloping by an upper wall 20 to the other end of the sump. It will be noted that the sump proper is divided by a wall 21 from a compartment 22 for holding a motor 23 which is suspended by bolts from a mounting plate 24 provided by the plate unit 18. A side ledge 25 extends along part of the length of the compartment to serve as a support for a pump 26.

The terminal ends of the rollers 10, 11 are equipped with stub shafts 27, 28 and 30, 31, respectively. These shafts extend through and beyond bearing blocks 32 carried by end plates 33, 34 and the first three carry chain sprockets 35, 36, and 37, respectively. The remaining stub shaft 31 carries a dual belt pulley 38. Drawing attention to Figs. 2 and 3, it is seen that the motor 23 is equipped with a gear reduction unit 40 from which extends a drive shaft 41 having a sprocket 42. By this arrangement the drive from the motor to the rollers is easily accomplished by a vertically running chain 43 between the sprockets 36 and 42 and a horizontally running chain 44 between the sprockets 35 and 37 at the other end of the rollers. The dual pulley 38 is used to drive the pump 26, the necessary belts running down to the sprocketed drive shaft of the pump being denoted 45. A foot switch 46 is conveniently provided for the motor, and when the same is activated it is thought to be apparent from the above description that the power will be transferred from the motor to the roller 10, over to the roller 11, and from the latter to the pump 26. It should be noted that the directions of rotation of the two rollers is the same so that when a pair of the wheels 47 of a car are located between the rollers as shown in Fig. 8 the tractive forces transferred from the rollers to the wheels will be additive.

Rotation of the vehicle wheels having been accomplished as afore-described, a cleaning of the wheels is performed by hydraulically moving a pair of brushes 50, 51 into engagement with the wheels and supplying them with the detergent 15. The hydraulic movement of the brushes is accomplished by a pair of identical double-acting piston assemblies 52, 53. The assembly 52 is illustrated in detail in Figs. 5–7 and it will be noted that the brush 50 is held by a holder 54 of a generally channel configuration having inturned lips 55 holding the brush body against the back 56 of the holder. A pair of set screws 57 is used to prevent vertical movement of the brush in the holder and at the same time gives an easy way to replace the brush when such is necessary.

The brush is advanced and retracted to and from engagement with the wheel by a piston rod 58 rigidly secured to the back 56 of the holder and motivated by a piston 60 working in a cylinder 61. Combination inlet and exhaust openings 63, 63 are provided at each end of the cylinder and these are connected by pipes 64, 65 with a control valve 66 having a foot lever 67. This valve is supplied with fluid under pressure, compressed air being usually preferred, through a supply hose 68. When the foot lever 67 is in the neutral position shown in Fig. 8, the control valve closes off both pipes 64, 65 from the compressed air supply. The foot lever can then be tilted by foot pressure in either direction to selectively supply compressed air to either side of the piston and vent the other side. Since the pipes 64, 65 are joined by corresponding pipes 70, 71 leading across to the other piston assembly 53, a synchronous action of the brushes 50, 51 can of course be obtained with the single control valve 66.

Each brush holder is given additional support by a pair of guide rods 72 which are guided in a pair of tubes 73. The latter are welded together and to a pair of angle bars 74 while the cylinder 61 is welded to the leg of a T-bar 75 positioned between the angle bars. Both of the angle bars and the T-bar are bolted down to the cement base and the various cover plates (unnumbered) which may be provided to give ready access to the hidden mechanisms.

The pump 26 draws detergent 15 through a pipe 76 from the bottom of the sump and supplies the same to a pair of supply hoses 77, 78 each leading to a respective nozzle 80 carried by one of the brush holders 54.

As shown in Fig. 8, these nozzles give best performance when positioned near the top of the side of the holder toward which the car wheel will be rotating. This arrangement insures that the entire area of the wheel which is engaged by the brush will be entirely and continuously covered with the detergent while it is in contact with the bristles. The detergent, after it has performed its cleaning office, flows back into the sump and is eventually recirculated by the pump 26 for reuse. Periodically the sump is emptied and cleaned, and then furnished with a fresh supply of detergent.

Reviewing the operation of the invention, the automobile whose wheels are to be washed is driven forwardly until its front wheels rest between both the rollers 10, 11. The operator of the washing equipment then presses the foot switch 46 to start the motor 23 thereby causing the rollers to turn. As soon as the car wheels have started to turn due to the action of the rollers, the operator presses the foot lever 67 in such a direction as will introduce compressed air to the pipes 65 and 71. This causes the pistons 60 to move toward the automobile and advance the brushes 50, 51 against the wheels regardless of the width between the outside faces of the wheels. For any given installation the force urging the brushes against the wheels is perforce a direct function of the pressure of the compressed air supplied to the control valve 66 and hence it can be varied at will by a conventional pressure control valve. Detergent is continuously supplied from the sump 14 to the nozzles 80 as soon as the motor 23 is started since the pump 26 is powered from the motor via the rollers. It is of no concern that the detergent may issue from the nozzles before the brushes are in contact with the wheels because in either instance the detergent drains back into the sump. In Fig. 8 only the side wall of the tire is shown as being washed; it is self-evident that the hub of the wheel can also be washed by using a larger brush if such is desired. When the front wheels are thoroughly scrubbed by the brushes the operator presses the foot lever 67 in the opposite direction to supply the compressed air to the pipes 64 and 70 and vent the pipes 65 and 71. As a result the brushes are automatically retracted from the wheels. The automobile is then started forwardly under its own power to advance the front wheels off of the rollers and bring the rear wheels onto the rollers. The cycle is then repeated to clean the rear wheels. During this transfer from the front wheels to the rear wheels it is preferable to have the motor 23 turned off. After each pair of the wheels has been driven from the rollers they are rinsed off to complete the cleaning operation.

The invention will, it is believed, be clear from the foregoing description, it being my intention that no limitations be implied and that the following claim be given the broadest interpretation which its language fairly admits.

What I claim is:

A wheel washing machine comprising, means for rotating a wheel to be washed, a cylinder, a double-acting piston working in the cylinder, valve means for selectively supplying fluid under pressure to either side of the piston, a brush holding assembly and a brush held thereby, said assembly being operatively interconnected with the piston for selected travel into and from a scrubbing position whereat the bristles of the brush are urged against a side of the rotating wheel with a force determined by the fluid pressure acting upon the piston, and a nozzle carried by the brush holding assembly and arranged to direct a cleaning agent supplied thereto against the rotating wheel directly in advance of the bristles of the brush whereby the cleaning agent will be disbursed over the approaching wheel surface to be washed just before contact therewith by said bristles.

References Cited in the file of this patent

UNITED STATES PATENTS

| | | |
|---|---|---|
| 450,149 | Gottfried | Apr. 14, 1891 |
| 1,231,092 | Suhm | June 26, 1917 |
| 1,412,732 | Young | Apr. 11, 1922 |
| 1,487,062 | Hohl | Mar. 18, 1924 |
| 1,807,765 | Vargo | June 2, 1931 |
| 1,909,869 | Randrup | May 16, 1933 |
| 2,215,692 | Fleming | Sept. 24, 1940 |
| 2,242,692 | Yingling | May 20, 1942 |
| 2,340,933 | Chilton | Feb. 8, 1944 |
| 2,480,735 | Holmes | Aug. 30, 1949 |
| 2,636,198 | Wilson | Apr. 28, 1953 |